July 6, 1965  R. RUMMEL  3,193,264
PROCESS AND DEVICE FOR PRODUCING BUILDING MATERIAL
Filed Nov. 20, 1962  3 Sheets-Sheet 1
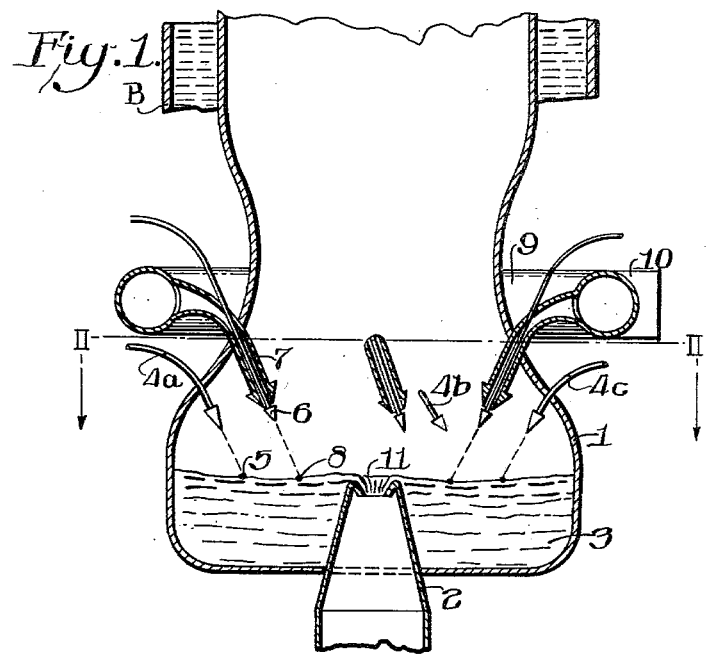
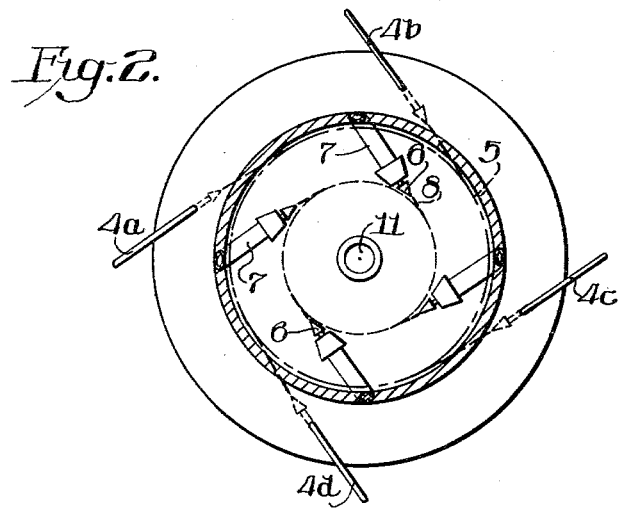
INVENTOR
Roman Rummel
BY Connolly and Hutz
ATTORNEYS

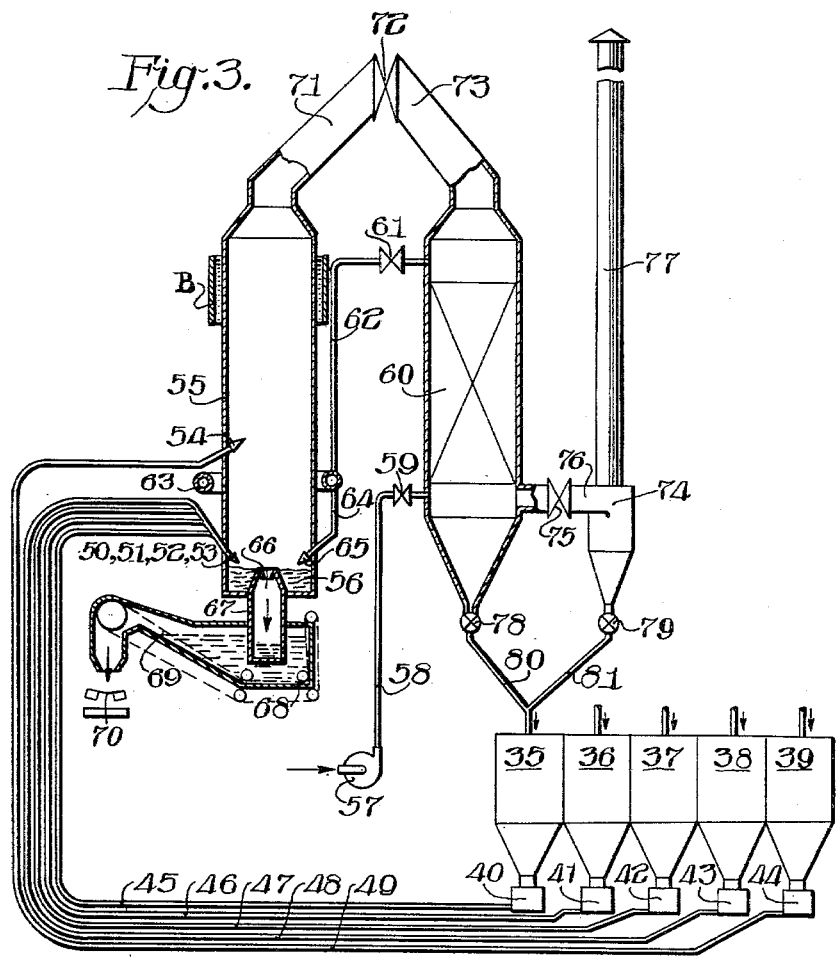

INVENTOR:
Roman Rummel 3,193,264
PROCESS AND DEVICE FOR PRODUCING
BUILDING MATERIAL
Roman Rummel, Daberger Weg 29, Bruhl,
near Cologne, Germany
Filed Nov. 20, 1962, Ser. No. 239,413
Claims priority, application Germany, June 25, 1959,
R 25,808
15 Claims. (Cl. 263—11)

This application is a continuation-in-part of my copending application Serial No. 35,945 filed June 14, 1960, now abandoned.

The present invention relates to a process and a device or apparatus for producing building material by melting raw materials in a turbulent slag bath.

In the known processes, lumpy raw materials are melted by buring coke and other highgrade fuels in a blast furnace to form, in their combined form, building materials of a special, chemical composition with corresponding qualities. These building materials are drawn off in melted condition after which they are granulated by immediate cooling, or are poured into shaping molds. In place of blast furnaces, electro furnaces are also used in which the raw materials are melted by an electric arc. It should be pointed out, however, that the special nature of the raw materials and fuels required for performing these processes permitted these methods to be used only in exceptional cases because of economic reasons.

In other known processes, the raw materials are ground to a fine powder, homogeneously mixed, even molded under certain circumstances and finally heated until the product sinters. These methods, however, require an expensive preparation of the raw materials.

In a further process boiler fly ash particles are melted by blowing them with flue gas horizontally and tangentially to the circumference into a combustion chamber of circular cross section. Fuel and air are blown through burners above the inlet for the fly ashes tangentially and obliquely downwards in such a way that the fly ashes are melted down in this furnace while suspended in the gas. In the combustion chamber the melted ashes agglomerate into drops and fall to the floor of the furnace where they collect and flow away through an outlet. By this method, however, only very small particles can be melted down.

With the process according to the present invention the above mentioned disadvantages are eliminated. It is an object of the present invention to melt the raw materials without expensive preparation and to mix them homogeneously in melted condition. According to this process, a slag bath is prepared from raw materials. Raw materials, preferably in fine-granular or powdery form and in amounts according to their proportion in the final product, are continuously introduced into said slag bath by gaseous or liquid carrying agents. Fuels and combustion agents are simultaneously added and the raw materials are converted into their melted state. The slag bath is kept in turbulence and rotation by the kinetic energy of the introduced raw materials and carrying agents and also by the introduced fuels and combustion agents. The melting product can be drawn off periodically or continuously as it develops. It can run into a water bath and granulate, or it can be poured in molds. In addition, it can be blown into insulating material such as rock wool. The combustion gases which develop from the combustion of the fuels are led into devices where the sensible heat is utilized e.g. for preheating of the raw materials or the combustion agents or for producing steam. Under certain circumstances, materials which are carried along by the gases are removed before the gases are drawn off. The process makes possible the treatment of raw materials without expensive preparation and without prior thorough mixing, using any fuels which can be of low value, solid, fluid or gaseous.

According to the invention, the raw materials, fuels, and combustion agents are introduced from the top tangentially on imaginary circles or closed curves assumed at the level of the surface of the slag bath concentrically to the circumference of the slag bath. The kinetic energy of the introduced materials maintains the slag bath in rotary motion. The introduced raw materials therefore follow from their introduction to their discharge as melting product, a substantially spiral path while mixing homogeneously in the slag bath after being converted into a melted state and heating up. The points of introduction of the raw materials, fuels and combustion agents are adaptable to the natural course of the melting, mixing and heating steps. The above-mentioned spiral path runs from the slag bath periphery to the center or in reverse order according to the location of the discharge means for the slag which can be located at the center of the slag bath or at the periphery of the slag bath. The raw materials first converted into melted state are exposed on their way in the slag bath toward the discharge means directly to the effect of the fuels and combustion agents introduced at high speed. They are thereby further heated and mixed before the finished melted product runs off. This after-heating is necessary in order to decrease the viscosity of the melting product and to render the homogeneous mixing possible.

With slag baths of more than 2 m. in diameter, the introduction of the raw materials is effected, evenly distributed and tangential, on to several imaginery circles of different diameter on the surface of the bath. In the same way, the distribution and direction of the nozzles for the introducetion of the fuels and the combustion agents are chosen to ensure an even melting and mixing process throughout the whole bath. An exception is in the region of the outlet for the melted material, where mainly fuel and the combustion agent act tangentially on an imaginary circle at the level of the surface of the bath in order to overheat the melted material immediately in front of the outlet and to strengthen the mixing effect. This is the smallest circle when the overflow is situated in the middle of the bath; with a circumferential outlet the biggest circle.

The raw materials can also be introduced into the melting bath below the surface from the side walls or from the bottom. By means of the circulating bath the raw materials introduced are quickly mixed with the molten material and carried away.

The raw materials can either be previously premixed or each material can be introduced separately into the slag bath. The separate introduction is more favorable because each raw material used in amounts according to its proportion in the final product is fed into the melting device and one can dispense with any previous mixing. It is useful to introduce the fuel in separate manner from the raw materials since better control can be achieved. It is then always possible to adjust the temperature in the melting device by altering the fuel and air quantity as required.

A bath, in which the raw materials are to be transformed rapidly into a molten state and thoroughly mixed, must be at least 200 mm. high. Baths with a diameter of about 2 to 3 m. generally have a bath height of about 0.5–1 m. This corresponds to an average residence time of a slag element in the melting bath of from about 30 to 60 minutes. For the melting of fine-grained or dust-shaped raw materials in a turbulent melting bath, the time required is only a fraction of a second. Thus the time allowed for the thorough mixing of the bath with the melting raw materials is comparatively long, and so enables a very even and homogeneous melted product to be obtained.

The raw materials therefore do not require to be mixed before melting. High melting materials, i.e. materials that show a higher melting temperature than the melting bath temperature, also become homogeneously bound in the melting bath when they form, together with the other materials introduced into the melting bath, lower melting complex compounds. They are rapidly heated in the molten material and dissolve by the formation of lower melting compounds.

The melting process in a slag bath, as compared to the known methods, i.e. melting in suspension, has important advantages.

For the melting of fly ash particles in suspension a certain period of time is necessary, depending on the size of the particles and the temperature of the furnace. As the particles to be melted are suspended in a gas stream, the time available for the melting depends on the length of stay of the gases in the burning chamber. This period is very short and covers only a fraction of 1 second. Therefore only small particles with a diameter of not more than about 0.1 mm. can be melted. They agglomerate into larger drops and fall to the floor of the furnace.

On the other hand, the melting time for a grain of material of 1 mm. in size in a turbulent melting bath according to the invention requires only ⅙ of that in a gas stream. For smaller grain sizes the ratio of the melting times becomes even more advantageous for the melting in a melting bath. For grains of 0.1 mm. in size the ratio is ⅟₅₀, and for grains of 0.02 mm. in size it is ⅟₂₅₀. The method of melting in a molten slag bath according to the invention is therefore a considerable improvement on the suspension method.

The fine-granular or powdery raw materials are fed pneumatically in a known manner from the storage bin over a measuring device and dust pump, i.e. a Fuller pump. Air is preferably used as the carrying gas. Solid fuels, too, can be fed in this manner into the melting device. In special cases, other gases i.e. heating gases, flue or combustion gases, and similar gases can also be used. Also, lumpy or very coarse-grain raw materials can be catapulted or charged directly by known devices into the slag bath. The raw materials should be introduced into the melting bath at a high speed in order to effect a deep penetration in the melting bath and to transfer its kinetic energy to the melting bath. The pneumatic conveyance of the raw materials is therefore preferred. This enables the raw materials to be introduced into the melting bath at speeds of 20 to 60 m./sec. and more.

The fuels and combustion agents can be introduced separately or jointly. They are preferably homogeneously mixed directly before or after their discharge from the nozzles if they are jointly introduced. Solid, liquid or gaseous fuels can be used. Solid fuels are introduced in fine-grain or powdery form into the nozzles pneumatically by carrier air. Liquid fuels are atomized by applying an appropriate overpressure or with air, vapor and the like directly at their discharge. Generally, air is used as combustion agent for the fuel. However, in exceptional cases, air rich in oxygen or oxygen can also be used. The combustion agents can be preheated in heat-exchange with the combustion gases in order to achieve high combustion temperatures with simultaneous utilization of the sensible heat of the escaping combustion gases. The carrying gases conveying the raw materials can also be preheated in this manner. The combustion agents should be introduced in or on to the melting bath at high speeds, preferably between about 50 and 300 m./sec. or even more when a particularly good mixing effect is required.

According to the invention, the flue dust carried along in the combustion gases is separated and returned to the slag bath. This flue dust consists of a small part of the raw materials introduced into the slag bath which was not taken up by the slag. Under certain circumstances, it consists of raw materials which were pretreated by the hot combustion gases. According to the type of raw materials used, the volatile components, i.e. alkalis, evaporate at the high temperature used. They sublimate from and during the travel of the combustion gases and can be obtained—dry or wet—in known manner. Also, gaseous decomposition products, i.e. $SO_2$, which are carried along with the combustion gases are utilizable in one of the known manners if these products exist in sufficient concentration.

The process according to the invention also has the advantage that any, even up to now worthless or low-grade raw materials, can be used for the preparation of high-grade building materials in view of the homogeneous mixing of the raw materials in melted state. It is possible to use as raw materials ashes, slags, or other suitable waste products such as refuse, which are frequently similar in their composition to that of a building material. Generally, only a comparatively small addition of one or more raw materials is sufficient to obtain a high-grade product. Another advantage is that all volatile components are expelled by the high working temperature, by evaporation, dissociation and the like, and a building material is obtained which is highly resistant against external wear.

The device for performing the process according to the invention consists of a container for the liquid slag bath and nozzles directed toward the slag bath for introducing the raw materials, fuels and combustion agents. An overflow type discharge of a least 200 mm. height preferably centrally disposed in the container is provided for continuously drawing off the slag to the extent that new slag is formed. Tapholes at a corresponding high level of the slag and under certain circumstances also thereabove in the container wall are provided for drawing off the slag periodically. The combustion gases arising while performing the process are drawn off at the top of the container. In their path of travel inside and/or outside of the container devices of a known kind are arranged for utilizing their sensible heat and for removing and obtaining materials, as mentioned above, which are carried along with the combustion gases.

The inclination of the nozzles in direction to the surface of the slag bath is chosen between 30° and 80°, preferably about 45°, according to the intended mixing and the motion of the slag bath. The nozzles for the fuels and combustion agents are directed tagentially to an imaginary circle at the level of the surface of the slag bath, if the slag discharge means is arranged centrally, in order to temper the raw materials in melted state. The circle has a diameter smaller than half the diameter of the container. The effective radius of the nozzles for the raw materials is then in the outer circumference of the slag bath where the process of melting the raw materials into the slag is initiated. The nozzle arrangement is reversed for a continuous or discontinuous extraction of the slag through a taphole at the outer wall of the container. The effective radius of the nozzles for the raw materials is in the center, while for the fuels and combustion agents, it is partially off center in order to heat the raw materials after they are melted to a high temperature on their way through the heated zone whereby they are homogeneously mixed.

The container for the slag bath is preferably circular or oval-shaped. The nozzles or devices for introducing the raw materials, fuels and combustion agents are uniformly distributed over the circumference of the container in order to achieve a steady course of the operations, like melting, mixing, and heating in the reaction chamber.

There are openings in the container or in the walls of the path of the combustion gases, in order to introduce the raw materials in the more or less heated stream of combustion gases for preheating one or several raw materials as well as deacidifying, dehydrating, etc. Devices of known construction are provided for extracting these preheated materials from the stream of the combustion gases if the materials are of fine-grain or powdery condition. The pretreatment takes place in co-current with the combustion gases carrying along the materials in finely distributed form or in a vortex chamber. Coarse-grain raw materials are led in a shaft provided in counter-current arrangement to the combustion gases.

The container for the liquid slag bath is made of metallic double walls or of a system of closely joined pipes through which a cooling agent is led. These cooling walls enclose also at least a portion of the course of the combustion gases whereby the temperature drops to a point below the melting point of the slag bath. The container constructed in this way can be also arranged in a boiler plant, where the total or a part of the sensible heat of the combustion gases is utilized for producing steam of any pressure and temperature.

The device for performing the process according to the invention consists preferably of a vertical shaft formed by a system of closely joined boiler pipes. These are enclosed by a gas-tight jacket and provided with water-cooled nozzles or devices. Through these devices, the raw materials, fuels and combustion agents are introduced into the slag bath. One or several raw materials are fed into the shaft which has successive heat-exchangers for heating the combustion agents; and/or for producing and overheating steam; and/or for preheating the raw materials. Devices are also present here for extracting the powdery or fine-granular materials carried along by the combustion gases. There are also devices of a known kind for returning these materials into the slag bath. In the drawing, a form of construction of the device is schematically represented for performing the process according to the invention.

FIG. 1 of the drawing shows a longitudinal section of a melting container with discharge of the liquid melted product through a slag overflow located in the center of the slag bath;

FIG. 2 is a section of the container taken along line II—II of FIG. 1 showing the nozzles for introducing the raw materials, fuels and combustion agents;

FIG. 3 shows apparatus for preparing Portland cement;

Figure 4:
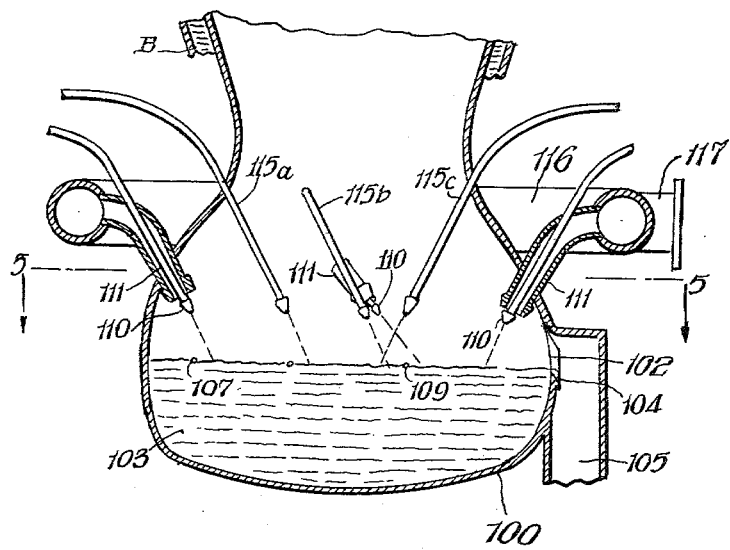
FIG. 4 shows a longitudinal section of a melting container with discharge of the liquid melted product through a slag overflow located in the periphery of the slag bath.

The melting container 1 (FIGS. 1 and 2) consists of a double jacket B through which water circulates. However, the container may be formed of closely joined pipes through which water is circulated. The container is part of a boiler plant. A water-cooled slag overflow 2 at the bottom of the container maintains the level of the slag bath 3 which has in the center a height of at least 200 mm. For introducing the raw materials into the slag bath, four water-cooled nozzles 4a, 4b, 4c, and 4d extend through the side walls of the container and are uniformly distributed over the circumference. They have an inclination of about 30° to the surface of the slag and are directed tangentially towards an imaginary circle 5 at the level of the surface of the slag. The fine-grain or powdery raw materials are blown through these nozzles pneumatically with air at an exhaust speed of about 30 to 50 m./sec. into the slag bath. For the introduction of the fuel, four nozzles 6 are provided, and for the combustion agents, i.e. highly preheated air, four nozzles 7. The fuel and combustion agent nozzles are combined as shown in one concentric type nozzle arrangement. The fuel outlet is directly in front of the outlet of the combustion agent nozzle. Fuels and combustion agents mix on their way to the slag bath and give a hot flame which transfers, within its effective radius directly, heat and kinetic energy to the slag bath. The fuel leaves its nozzle as a rule with a velocity of 30 to 50 m./sec., and the combustion agents with about 100 to 200 m./sec. The inclination of the nozzles of the fuel and the combustion agent to the surface of the slag is about 45°.

The nozzles are set in such a way that their center axes seen from above are tangent to an imaginary circle 8 at the level of the surface of the slag bath. The diameter of this circle is smaller than half the diameter of the circumference of the slag bath. In this manner, a very hot, turbulent zone is created in the center of the slag bath. The raw materials melted at the outer circumference of the slag bath have to pass through this zone.

The nozzles for the combustion agents are connected with a closed-circuit pipe line 9 into which highly preheated combustion air is fed through the connecting piece 10.

Through the opening 11 of the slag overflow 2, the finished melted product flows off continuously. The hot combustion gases escape spirally rotating towards the top. Thereby whirling droplets of slag and particles of raw material not taken up by the slag are catapulted and flow back from the container wall into the slag bath. In this case the sensible heat of the escaping hot combustion gases is utilized partly for the production of steam in boiler B.

The cooling of the container wall causes a deposit to form on the wall which curbs the conduction of heat to a certain extent. This deposit forms within the range of the highest temperature down to the melting point of the slag. It is therefore not necessary to line the container with fireproof materials. Such a lining would not resist the chemical attack of the slag. The container wall is provided with welded steel pins at short distances in known manner to prevent the chipping off of the protective layer of slag from the wall, i.e. with temperature changes.

The FIGURES 1 and 2 show an apparatus in which the melting bath has a diameter of up to about 1.5 m., maximum 2 m. For larger furnace chambers more nozzles for the raw materials, fuels and combustion agents should be provided, which should also be evenly spaced. However, their direction of action is not confined to the imaginary circles 5 and 8 at the level of the surface of the melting bath but also tangentially to circles which lie between circles 5 and 8 as well as between circle 5 and the outer bath circumference. In this way the action of the melting bath on the raw materials introduced, the mixing process in the molten slag and the supply of heat can be adapted to meet the respective requirements.

The apparatus for the preparation of Portland cement (FIG. 3) consists of bins 35, 36, 37, 38 and 39 which contain supplies of fine-granular caustic lime, clay, sand, carbon and calcite respectively. These raw materials are measured by metering devices 40, 41, 42, 43, and 44 respectively and fed into the feed lines 45, 46, 47, 48 and 49 respectively which transport them pneumatically with carrier air to the nozzles 50, 51, 52, 53, 54 respectively into the melting container 55 at which points they are blown into the slag bath 56. Worm gears, bucket wheels, rotary mixing tables, and the like, of known construction are used for the metering devices which guarantee the continuous supply of the materials in measured quantities. They are transported through pumps, or nozzles of an injector type with air and another suitable gas as carrier. The air for the fuel combustion is led through air blower 57, conduits 58 and control elements 59 into one of the air heaters 60 which are alternately heated in a known manner by escaping combustion gases and cooled by combustion air. The blast heaters 60 are switched over at determined intervals. Only one air heater 60 is shown in the drawing. The air highly heated in the heater is led from the heater through a valve control 61 and conduit 62 to the ring conduit 63 where it is uniformly distributed through connecting conduits 64 to nozzles 65 and into the melting contianer 55. The raw materials are melted in the melting container as already described. The melting product flows over into the slag overflow 66 through immersion tube 67 and into the slag tub 68 filled with water. There is granulates and is carried off by a scraper belt 69 to a conveyor belt 70 which transports the melting product to the grinding equipment. The temperature of the water in the slag container is kept at about 80 to 90° C. close to its boiling point, because the melting product has to reach the grinding equipment in dry state. The granulate after its discharge has still so much sensible heat that the water on its surface evaporates.

The combustion gases escape at the top of the melting container 55 through conduit 71 and pass through valve control 72 and conduit 73 leading into the top of the heaters 60. Starting at the limestone or calcite bin 39 through the metering and conveying devices 44, conduits 49, and nozzles 54, fine-grain limestone is blown by air or by combustion gases, separated from the main flow, into the hot stream of combustion gases. The nozzles 54 are in opposite direction to the rotation of the combustion gases rising in the shaft of the melting container 55 so that the limestone and combustion gases are homogeneously mixed. The combustion gases transfer a part of their sensible heat to the fine-grain limestone raising it to a temperature of nearly 1100° C. whereby it is deacidified. The now caustic lime is carried through the blast heater 60 where the mixture gives up its sensible heat to the cooler combustion air dropping to a temperature of about 250° C. The caustic lime is totally removed from the combustion gases in the separating device 74 which gases pass thereinto through conrtol valve 75 and conduit 76 and escape through the chimney 77 into the atmosphere. The caustic lime accumulated partly already at the bottom of the blast heater and in the separating device is led over the valves 78 and 79 and the conduits 80, and 81 to the bin 35. The melting container 55 is arranged in the boiler plant which because of clearness is not shown fully in the drawing. The heat interchange through the wall is utilized for producing steam in boiler B. An overheater arranged at a suitable place in the path of the combustion gases overheats the produced steam before it leaves the boiler system. The boiler feed water is used as cooling water for the nozzles and the slag overflow.

Recuperators, too, can be used in place of the blast heaters which preheat the combustion air regeneratively. They are more simply constructed, because they operate without switching elements.

Also air or steam can be used in place of water for cooling the melting product if this seems more suitable for the product.

Figure 5:
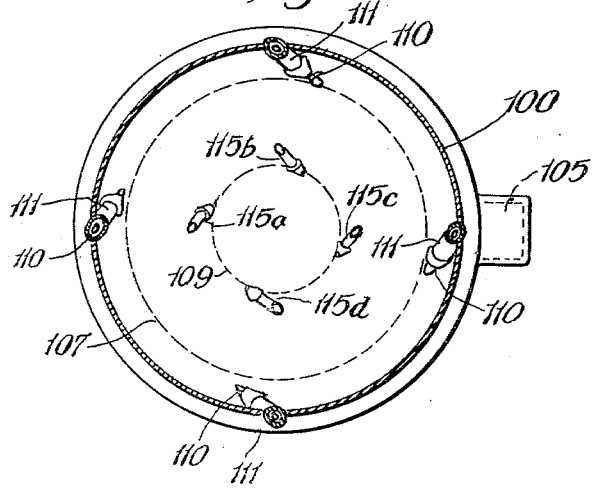
FIG. 5 is a section of the container of FIG. 4 taken along line 5—5 showing the nozzles for introducing the raw materials, fuels and combustion agents.

The melting vessel 100 (FIGS. 4 and 5) has a shape similar to that of FIG. 1 and contains double jacket B through which water circulates; however, the run-off of the melting stock is not central but is arranged at the circumference of the melting bath 103. An opening 102 is provided in the wall of the melting vessel at the level of the melting bath surface through which the melting stock runs off into canal 105 by means of channel 104.

In this example, two nozzle groups were chosen, whose directional projections on the surface of the melting bath tangenate in the same direction on this surface two imaginary circles 107 and 109, concentrically to the bath circumference. To the outer circle are directed fuel nozzles 110 and combustion agent nozzles 111. Raw material nozzles 115a, 115b, 115c and 115d are directed to the inner circle 109.

Commbustion agent nozzles 111 are connected with ring conduit 116 to which the combustion agents are introduced by means of connecting piece 117.

The following examples are set forth to illustrate the invention but it is not intended that the invention be limited thereto:

*Example I*

For daily production of about 150 tons of slag of Portland cement, the following raw materials are pneumatically introduced per hour at a speed of 50 to 60 m./sec. into a melting container having a diameter of about 1.6 meters: 7.36 tons of limestone from which 4.12 tons of caustic lime develop which is introduced into the slag bath, 1.58 tons of clay, and 0.77 ton of sand.

14,500 m.$^3$ per hour combustion air are preheated to about 800 to 1000° C. and blown at a speed of about 250 m./sec. into the slag bath. Besides, 500 m.$^3$ per hour compressed air are used for conveying the raw materials and 1.79 tons per hour of coal with a calorific value of about 7,000 kcal./kg. as the fuel. The coal is introduced at a speed of about 40 to 50 m./sec. The raw materials and the fuel are fine-granular or powdery with a grain size of about 0 to 3 mm. The distances between the surface of the slag bath which has a height of about 500 to 600 mm. and the nozzles for the raw materials and the combined nozzles for air and fuel are 300 mm. and 500 to 600 mm. respectively. The average residence time of the slag in the bath is about 0.5 hour. The production per hour is 6.30 tons of slag of Portland cement with a content of approximately 66% CaO, 24% SiO$_2$, and 10% Al$_2$O$_3$.

*Example II*

For the daily production of 100 tons of melting basalt stones of extreme hardness and wear resistance, 4.2 tons of basalt lava with a grain size of 0–2 mm. are introduced into a melting container of 2500 mm. diameter with 200 Nm.$^3$ (cubic meters at a temperature of 0° and a pressure of 760 mm. Hg) per hour of compressed air as carrier gas. 2.59 tons of petroleum per hour serve as fuel which is vaporized with 700 Nm.$^3$ of compressed air and burned with 30,000 Nm.$^3$ of air preheated by the discharged flue or combustion gases in the heat exchanger at 700° C. About 25 m.$^3$ of feed water is introduced per hour into the boiler system.

The resulting melting basalt is poured in forms and cooled slowly (tempered). 4.16 tons of melting basalt stones and 23 tons of steam are produced per hour with a pressure of 100 ata. (absolute pressure in atmospheres) and a temperature of 500° C. The steam can be employed for producing a current.

*Example III*

In a steam boiler plant, 100 tons of ashes are obtained daily the composition of which on the average amounts to

| | Percent by weight |
|---|---|
| SiO$_2$ | 57 |
| Al$_2$O$_3$ | 20 |
| Fe$_2$O$_3$ | 7 |
| CaO | 7 |
| MgO | 4 |
| SO$_3$ | 3 |
| C$_2$O$_5$ | 0.5 |
| Alkali | 1.5 |

From these ashes, road building materials or additives for cement in the form of crushed rock or fine gravel are produced. 4.16 tons of ashes having a size of 0–2 mm.

with 150 Nm.³ of compressed air and 0.42 ton of lime dust with 50 Nm.³ of compressed air are blown per hour at a speed of about 40 to 50 m./sec. into a melting container of about 2000 mm. diameter. The distance between the nozzles for the raw materials and the surface of the slag bath is about 250 to 300 mm. Coal with an ash content of 19% and a net heating value of 6000 kcal./kg. as well as with a granulation of 0–1 mm. is used as fuel. 3.79 tons of coal with 150 Nm.³ of compressed air are introduced hourly and burned with 27,000 Nm.³ combustion air preheated to about 700° C. in the heat exchange with discharged combustion gases.

The speed of the hot combustion air discharged from the nozzles is about 250 to 300 m./sec. The air accelerates the coal which comes out in the center of the air nozzles at a speed of about 40 m./sec. on the path to the surface of the slag bath which path is about 800 mm. long. The air and the coal deeply penetrate into the thus turbulently stirred and strongly heated slag bath and the combustion mainly takes place in the bath. About 50 kg. of dust accumulate in the dust separator which is reconveyed. The average residence time of the molten slag in the bath which has a temperature of about 1650° C. is about 0.75 hour.

4.97 tons of fluid slag are removed hourly and deposited in a pit where it slowly cools. Thereafter the slag is broken and sorted. The composition of the produced broken stones is as follows:

| | Percent by weight |
|---|---|
| $SiO_2$ | 56.4 |
| $Al_2O_3$ | 19.6 |
| $Fe_2O_3$ | 6.9 |
| CaO | 11.5 |
| MgO | 4.0 |
| Other ingredients | 1.6 |

The production of steam with a pressure of 100 ata. (absolute pressure in atmospheres) and a temperature of 500° C. amounts to 19.25 tons hourly.

Obviously many modifications and variations of the present invention are possible in the light of the above teachings. It is, therefore, to be understood that within the scope of the appended claims the invention may be practiced otherwise than as specifically described.

What is claimed is:

1. An apparatus for producing building materials comprising container means of substantially circular cross section for holding a liquid slag bath in a substantially circular cross sectional area with a substantially circular slag bath surface circumference, raw materials discharge means for discharging solid raw materials into the liquid slag bath tangentially to at least one first imaginary circle assumed at the slag bath surface and concentric to the slag bath surface circumference, fuels and combustion agents discharge means for discharging fuels and combustion agents into the slag bath tangentially to at least one second imaginary circle assumed at the slag bath surface, said second imaginary circle having a different radius from the first imaginary circle, and overflow means spaced at least 200 millimeters above the bottom of the container means for withdrawing the liquid slag bath.

2. An apparatus as defined in claim 1 wherein the raw material discharge means and the fuels and combustion agents discharge means comprise a plurality of nozzles.

3. An apparatus as defined in claim 1 in which the raw material discharge means and the fuels and combustion agent discharge means are set at angles between 30 degrees and 80 degrees with respect to the slag bath surface.

4. An apparatus as defined in claim 1 in which the fuels and combustion agent discharge means discharges onto the slag bath surface tangentially to at least one second imaginary circle assumed on the slag bath surface which second circle has a diameter smaller than one-half the diameter of the slag bath surface circumference.

5. An apparatus as defined in claim 1 in which the raw materials discharge means discharges into the slag bath tangentially to at least one first imaginary circle assumed on the slag bath surface, which first circle has a diameter greater than one-half the diameter of the slag bath surface circumference.

6. The apparatus as defined in claim 1 wherein the first imaginary circle at which the raw materials discharge means tangentially discharges has a diameter greater than the second imaginary circle at which the fuels and combustion agents discharge means tangentially discharges and the overflow means is located at the center of both imaginary circles.

7. The apparatus as defined in claim 1 wherein the first imaginary circle at which the raw materials discharge means tangentially discharges has a diameter less than the second imaginary circle at which the fuels and combustion agents discharge means tangentially discharges and the overflow means is located at the slag bath surface circumference.

8. A process for producing building material comprising
  (A) melting and confining starting raw material to form a process area of molten slag having a substantially circular circumference, a substantially circular horizontal cross sectional area and a depth of at least 200 millimeters,
  (B) discharging solid raw materials in carrying agents into the molten slag tangentially to at least one first imaginary circle assumed on the surface of the molten slag, said first circle being concentric to the circumference of the molten slag, whereby kinetic energy caused by discharging the solid raw materials maintains the molten slag in rotary motion, mixes the solid raw materials with the molten slag, and the solid raw materials are melted by contact with the molten slag,
  (C) after-heating and further mixing the molten raw materials by discharging and impinging fuels and combustion agents directly onto the surface of the molten slag tangentially to at least one second imaginary circle assumed on the surface of the molten slag, said second circle being concentric to the circumference of the molten slag and having a radius different from the first imaginary circle, whereby heat from burning the fuels and combustion agents maintains the molten slag in a molten state and kinetic energy caused by discharging and impinging the fuels and combustion agents maintains the molten slag in turbulence and rotation, and
  (D) removing molten raw materials from the process area, the rotary motion of the molten slag causing the raw materials to follow a substantially spiral path from a point of discharge into the molten slag and a point of removal from the process area.

9. A process according to claim 8 wherein the solid raw materials are discharged onto the surface of the molten slag.

10. A process according to claim 8 wherein the solid raw materials are discharged under the surface of the molten slag.

11. A process according to claim 8 wherein the solid raw materials are discharged on the surface of the molten slag, the fuels and combustion agents are discharged and impinged tangentially to a second imaginary circle whose radius is smaller than the radius of the first imaginary circle at which the solid raw materials are discharged and the molten slag is removed at the center of both imaginary circles.

12. A process according to claim 8 wherein the solid raw materials are discharged on the surface of the molten slag, the fuels and combustion agents are discharged and impinged tangentially to a second imaginary circle whose radius is larger than the radius of the first imaginary circle at which the solid raw materials are discharged and the molten slag is removed at the periphery of the process area.

13. A process according to claim 8 wherein the solid raw materials are discharged at several first imaginary circles, the circles having different diameters and the fuels and combustion agents are discharged at a single second imaginary circle, the diameter of said second imaginary circle being less than the diameters of the first imaginary circles.

14. A process according to claim 8 wherein the fuels and combustion agents are discharged and impinged directly and with high speed on the surface of the molten slag at a point wherein the raw materials have traveled more than one-half their spiral path from the point of discharge into the molten slag and the point of removal from the process area.

15. A process according to claim 8 wherein each raw material is individually discharged into the molten slag.

References Cited by the Examiner

UNITED STATES PATENTS

| | | | |
|---|---|---|---|
| 1,073,820 | 9/13 | Richards | 106—103 X |
| 2,905,116 | 9/59 | Sifrin et al. | 110—28 |
| 2,917,011 | 12/59 | Korner | 110—28 |
| 2,923,260 | 2/60 | Rummel | 110—28 |

CHARLES SUKALO, *Primary Examiner.*

JOHN J. CAMBY, PERCY L. PATRICK, *Examiners.*